(12) United States Patent
Sun et al.

(10) Patent No.: US 9,230,306 B2
(45) Date of Patent: Jan. 5, 2016

(54) SYSTEM FOR REDUCING DEPTH OF FIELD WITH DIGITAL IMAGE PROCESSING

(71) Applicant: Semiconductor Components Industries, LLC, Phoenix, AZ (US)

(72) Inventors: Yajie Sun, Mountain View, CA (US); David R. Pope, Fremont, CA (US)

(73) Assignee: Semiconductor Components Industries, LLC, Phoenix, AZ (US)

( * ) Notice: Subject to any disclaimer, the term of this patent is extended or adjusted under 35 U.S.C. 154(b) by 522 days.

(21) Appl. No.: 13/760,569

(22) Filed: Feb. 6, 2013

(65) Prior Publication Data

US 2013/0208093 A1    Aug. 15, 2013

Related U.S. Application Data

(60) Provisional application No. 61/596,115, filed on Feb. 7, 2012.

(51) Int. Cl.
*G06K 9/40* (2006.01)
*G06T 5/00* (2006.01)
*H04N 13/02* (2006.01)
*H04N 5/262* (2006.01)

(52) U.S. Cl.
CPC ............... *G06T 5/003* (2013.01); *G06T 5/002* (2013.01); *H04N 5/2621* (2013.01); *H04N 13/0246* (2013.01); *G06T 2207/10028* (2013.01)

(58) Field of Classification Search
CPC . G06K 9/00033; G06K 9/2036; G06K 9/209; G06K 2209/40; H04N 5/2226; H04N 5/23212; H04N 5/23219; H04N 5/2621; H04N 13/0018; H04N 13/0239; H04N 13/0246; H04N 13/0271; G06T 5/002; G06T 5/003; G06T 5/20; G06T 7/0018; G06T 7/0051; G06T 7/0069; G06T 15/503; G06T 2207/10012; G06T 2207/10021; G06T 2207/10028; G02B 27/0075; G01C 3/32

See application file for complete search history.

(56) References Cited

U.S. PATENT DOCUMENTS

| | | | | |
|---|---|---|---|---|
| 6,229,913 | B1* | 5/2001 | Nayar | G02B 27/2278 250/201.4 |
| 8,035,641 | B1 | 10/2011 | O'Donnell | |
| 8,305,485 | B2* | 11/2012 | Kane | G06T 7/0059 348/176 |
| 8,335,390 | B2 | 12/2012 | Li et al. | |
| 8,340,456 | B1 | 12/2012 | DaneshPanah et al. | |
| 8,737,756 | B2* | 5/2014 | DaneshPanah | G06T 7/0069 348/207.99 |
| 8,989,517 | B2* | 3/2015 | Morgan-Mar | H04N 5/23212 348/207.1 |
| 9,007,441 | B2* | 4/2015 | Sun | H04N 13/0018 348/47 |
| 2013/0033579 | A1* | 2/2013 | Wajs | G02B 7/365 348/46 |
| 2015/0146994 | A1* | 5/2015 | Arnison | G06T 7/0051 382/254 |

* cited by examiner

*Primary Examiner* — Jose Couso
(74) *Attorney, Agent, or Firm* — Treyz Law Group, P.C.

(57) ABSTRACT

An electronic device may have a camera module. The camera module may capture images having an initial depth of field. The electronic device may receive user input selecting a focal plane and an effective f-stop for use in producing a modified image with a reduced depth of field. The electronic device may include image processing circuitry that selectively blurs various regions of a captured image, with each region being blurred to an amount that varies with distance to the user selected focal plane and in response to the user selected effective f-stop (e.g., a user selected level of depth of field).

17 Claims, 10 Drawing Sheets

SYSTEM FOR REDUCING DEPTH OF FIELD WITH DIGITAL IMAGE PROCESSING

This application claims the benefit of provisional patent application No. 61/596,115, filed Feb. 7, 2012, which is hereby incorporated by reference herein in its entirety.

BACKGROUND

The present invention relates to imaging systems and, more particularly, to imaging systems in which perceived depth-of-field can be reduced by digital image processing.

Electronic devices such as cellular telephones are often provided with camera sensors. Users of these devices sometimes desire to capture images having relatively shallow depth of field. The depth of field in an image is the range of distances over which the image appears to be in focus. In an image with a shallow depth of field, only objects that are close to the plane of focus will appear sharp and in focus. Objects in an image with a shallow depth of field image that lie in front of the plane of focus or behind the plane of focus will be blurred. Images with a large depth of field appear sharp over a greater distance. In this type of scenario, even objects that lie significantly off of the plane of focus will appear to be sharp. Users may prefer images with a shallow depth of field for various artistic and functional reasons.

One way to obtain an image with a shallow depth of field involves increasing the aperture of the camera lens. This process can only be used in devices with adjustable-aperture lenses. The use of a large aperture to reduce depth of field may also require the use of a fast exposure time, which may prevent the user from intentionally incorporating motion blur into a captured image.

Another way in which to obtain images with shallow depth of field involves the use of digital image processing to reduce the depth of field of an image. Conventional digital image processing techniques for reducing the depth of field of an image involve blurring regions (i.e., kernels) that are further from the focal plane to a greater extent than regions (i.e., kernels) that are closer to the focal plane. With conventional techniques, the kernel size (e.g., width) becomes larger with increasing distance from the focal plane. As a given kernel increases in size, the total number of pixels within that kernel, all of which need to be processed to blur the given kernel, increases by the approximately the square of the kernel width. The conventional digital image processing techniques are therefore computationally inefficient, expensive, and inappropriate for many applications.

DETAILED DESCRIPTION

Figure 1:
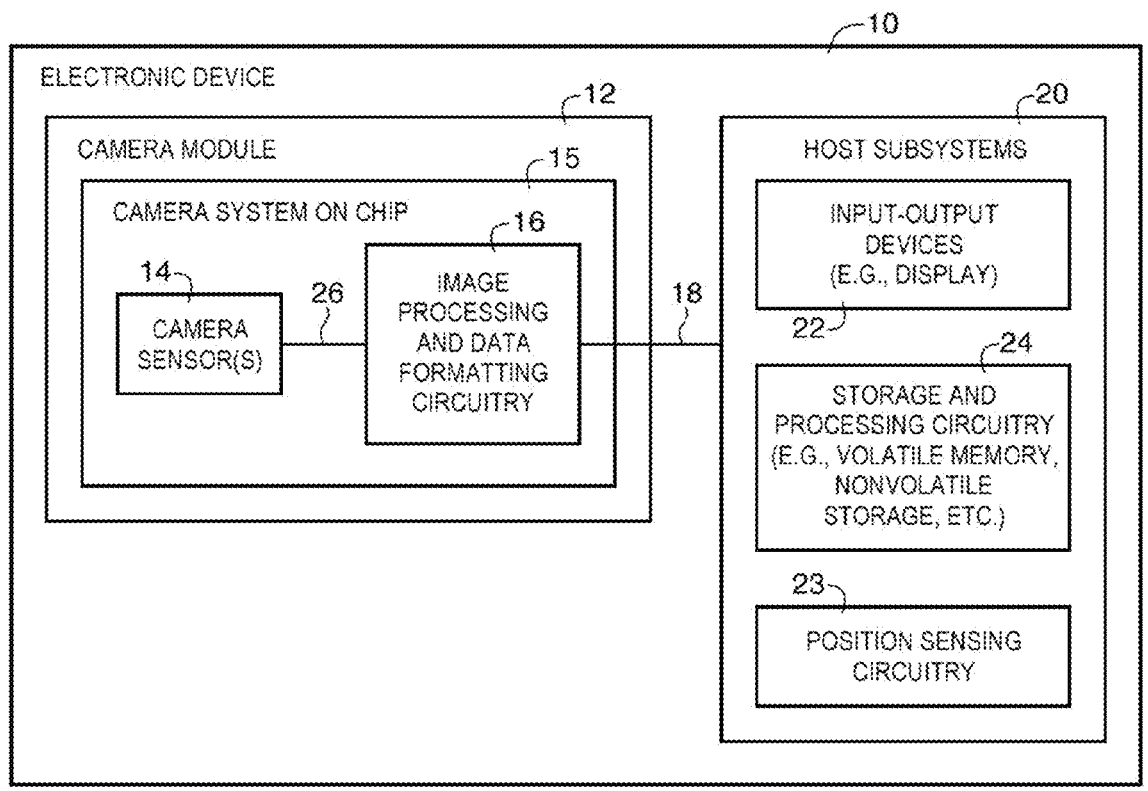
FIG. 1 is a diagram of an electronic device and computing equipment that may be used in producing images with decreased depth of field in accordance with an embodiment of the present invention.

Digital camera modules are widely used in electronic devices. An electronic device with a digital camera module is shown in FIG. 1. Electronic device 10 may be a digital camera, a laptop computer, a display, a computer, a cellular telephone, or other electronic device. Imaging system 12 (e.g., camera module 12) may include one or more image sensors 14 and corresponding lenses. During operation, a lens focuses light onto an image sensor 14. The lens may have fixed aperture. The pixels in image sensor 14 include photosensitive elements that convert the light into digital data. Image sensors may have any number of pixels (e.g., hundreds or thousands or more). A typical image sensor may, for example, have millions of pixels (e.g., megapixels). In high-end equipment, sensors with 10 megapixels or more are not uncommon. In at least some arrangements, device 10 may include two (or more) image sensors 14, which may capture images from different perspectives. When device 10 includes two image sensors 14, device 14 may be able to capture stereo images.

Still and video image data from camera sensor 14 may be provided to image processing and data formatting circuitry 16 via path 26. Image processing and data formatting circuitry 16 may be used to perform image processing functions such as adjusting white balance and exposure and implementing video image stabilization, image cropping, image scaling, etc. Image processing and data formatting circuitry 16 may also be used to compress raw camera image files if desired (e.g., to Joint Photographic Experts Group or JPEG format).

In at least some situations, a user of device 10 may desire to produce an image having a relatively shallow depth of field for artistic or other reasons. In particular, the user may desire to have device 10 produce an image in which objects at a particular distance from device 10 are in focus, but objects closer or further than that particular distance are out of focus (e.g., blurred). In these and other arrangements, image processing circuitry such as circuitry 15 and/or circuitry 24 may be used to reduce the depth of field of images captured by image sensors 14.

In a typical arrangement, which is sometimes referred to as a system on chip or SOC arrangement, camera sensor 14 and image processing and data formatting circuitry 16 are implemented on a common integrated circuit 15. The use of a single integrated circuit to implement camera sensor 14 and image processing and data formatting circuitry 16 can help to minimize costs. If desired, however, multiple integrated circuits may be used to implement circuitry 15. In arrangements in which device 10 includes multiple camera sensors 14, each camera sensor 14 and associated image processing and data formatting circuitry 16 can be formed on a separate SOC integrated circuit (e.g., there may be multiple camera system on chip modules 12).

Circuitry 15 conveys data to host subsystem 20 over path 18. Circuitry 15 may provide acquired image data such as captured video and still digital images to host subsystem 20.

Electronic device 10 typically provides a user with numerous high level functions. In a computer or advanced cellular telephone, for example, a user may be provided with the ability to run user applications. To implement these functions, electronic device 10 may have input-output devices 22 such as projectors, keypads, input-output ports, and displays and storage and processing circuitry 24. Storage and processing circuitry 24 may include volatile and nonvolatile memory (e.g., random-access memory, flash memory, hard drives, solid state drives, etc.). Storage and processing circuitry 24 may also include processors such as microprocessors, microcontrollers, digital signal processors, application specific integrated circuits, etc.

Device 10 may include position sensing circuitry 23. Position sensing circuitry 23 may include, as examples, global positioning system (GPS) circuitry and radio-frequency-based positioning circuitry (e.g., cellular-telephone positioning circuitry).

Figure 2:
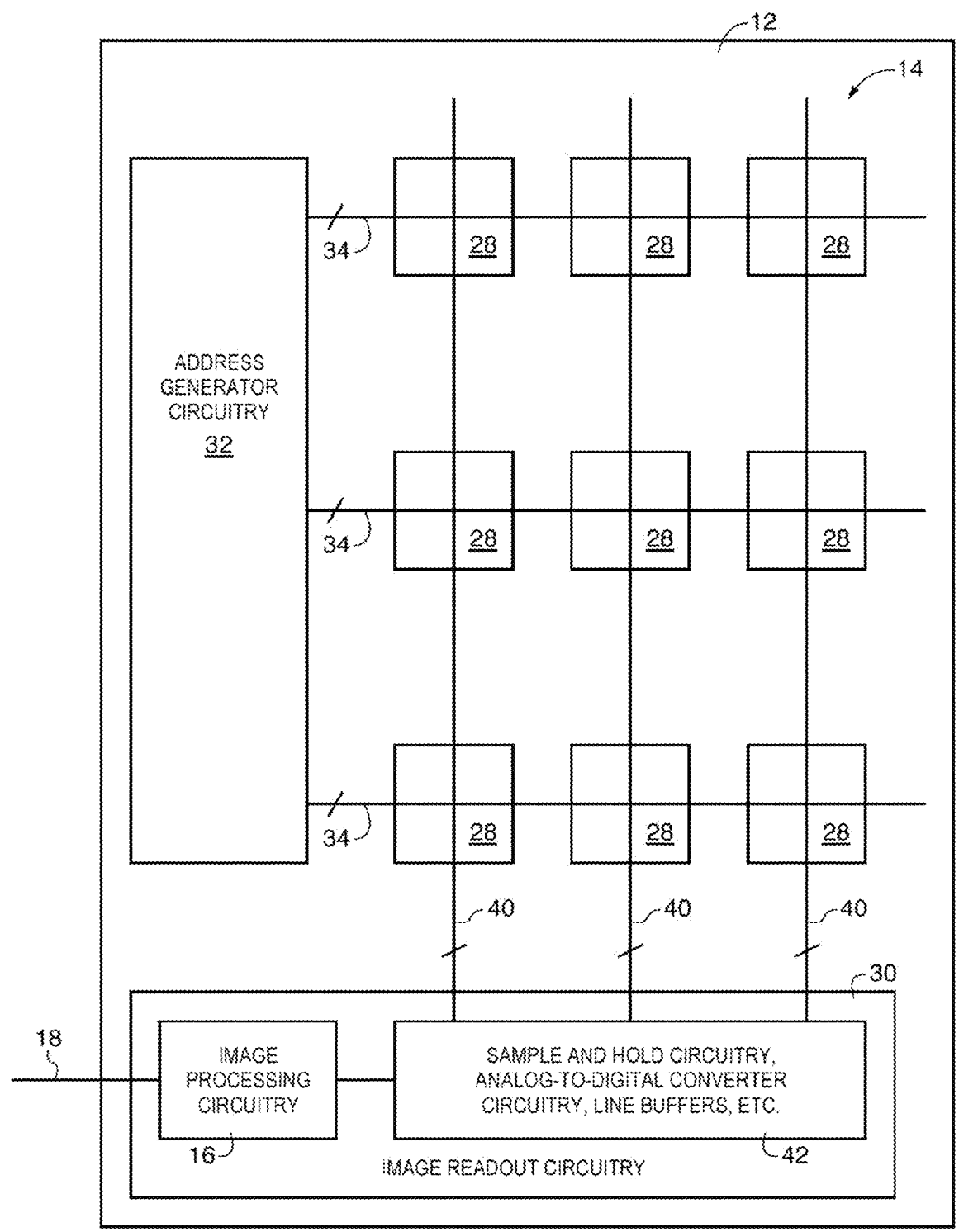
FIG. 2 is a diagram of an illustrative array of light-sensitive imaging pixels and control circuitry coupled to the array of pixels that may form a camera sensor such as the camera sensor of FIG. 1 in accordance with an embodiment of the present invention.

An example of an arrangement for sensor array 14 is shown in FIG. 2. As shown in FIG. 2, device 10 may include an array 14 of pixels 28 coupled to image readout circuitry 30 and address generator circuitry 32. As an example, each of the pixels in a row of array 14 may be coupled to address generator circuitry 32 by one or more conductive lines 34. Array 14 may have any number of rows and columns. In general, the size of array 14 and the number of rows and columns in array 14 will depend on the particular implementation. While rows and columns are generally described herein as being horizontal and vertical rows and columns may refer to any grid-like structure (e.g., features described herein as rows may be arranged vertically and features described herein as columns may be arranged horizontally).

Address generator circuitry 32 may generate signals on paths 34 as desired. For example, address generator circuitry 32 may generate reset signals on reset lines in paths 34, transfer signals on transfer lines in paths 34, and row select (e.g., row readout) signals on row select lines in paths 34 to control the operation of array 14. If desired, address generator circuitry 32 and array 14 may be integrated together in a single integrated circuit (as an example).

Signals 34, generated by address generator circuitry 32 as an example, may include signals that dynamically adjust the resolution of array 14. For example, signals 34 may include binning signals that cause pixels 28 in a first region of array 14 to be binned together (e.g., with a 2-pixel binning scheme, with a 3-pixel binning scheme, or with a pixel binning scheme of 4 or more pixels) and that cause pixels 28 in a second region of array 14 to either not be binned together or to be binned together to a lesser extent than the first region. In addition, signals 34 may cause pixels 28 in any number of additional (e.g., third, fourth, fifth, etc.) regions of array 14 to be binned together to any number of different, or identical, degrees (e.g., 2-pixel binning schemes, 3-or-more-pixel binning schemes, etc.).

Image readout circuitry 30 may include circuitry 42 and image processing and data formatting circuitry 16. Circuitry 42 may include sample and hold circuitry, analog-to-digital converter circuitry, and line buffer circuitry (as examples). As one example, circuitry 42 may be used to measure signals in pixels 28 and may be used to buffer the signals while analog-to-digital converters in circuitry 42 convert the signals to digital signals. In a typical arrangement, circuitry 42 reads signals from rows of pixels 28 one row at a time over lines 40. With another suitable arrangement, circuitry 42 reads signals from groups of pixels 28 (e.g., groups formed from pixels located in multiple rows and columns of array 14) one group at a time over lines 40. The digital signals read out by circuitry 42 may be representative of charges accumulated by pixels 28 in response to incident light. The digital signals produced by the analog-to-digital converters of circuitry 42 may be conveyed to image processing and data formatting circuitry 16 and then to host subsystem 20 (FIG. 1) over path 18.

If desired, device 10 may include image processing circuitry capable of reducing the depth of field (e.g., producing images with a simulated shallow depth of field) of images. The images may be captured by device 10 or may be captured by another device and transferred to device 10 for image processing. With some suitable arrangements, depth controlled blur (e.g., defocus) may be used to mimic shallow depth of fields (e.g., to reduce the depth of field of an image). As an example, for each point in an image, the amount of blur applied by image processing circuitry to that point may scale with the distance between that point and the focal plane (e.g., points closer to or further from the image sensor than the focal plane may be blur by an amount that increases with distance from the focal plane). In at least some arrangements, each point may be blurred by the appropriate amount by replacing image data for that point by image data averaged from points within a circle of confusion centered on that point. The radius of the circle of confusion may correspond to the amount of blur that is being applied.

Figure 4:
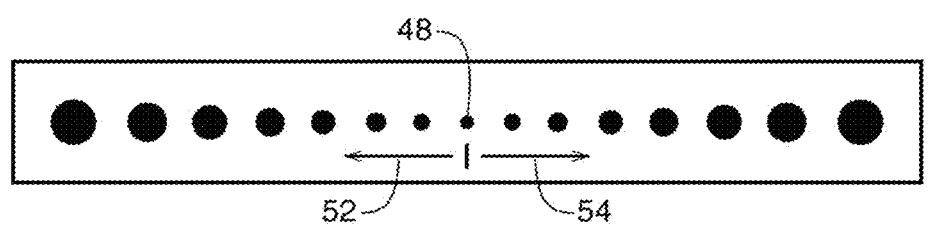
FIG. 4 is a diagram of illustrative circles of confusion with sizes that vary with distance from a focal plane and that may be used in blurring images to reduce the depth of field of those images in accordance with an embodiment of the present invention.

Various illustrative circles of confusion are shown in FIG. 4. As shown in FIG. 4, the size of the circle of confusion used in blurring each point in an image varies with its distance from a focal point, illustrated in FIG. 4 by focal point 48. In particular, points that are behind focal point 48 have increasing large circles of confusion (as illustrated by arrow 54) as they move further behind focal point 48 and points that are in front of focal point 48 have increasingly larger circles of confusion (as illustrated by arrow 52) as they move further in front of focal point 48.

In order to provide a blurring process that is computationally predictable and reasonable (e.g., does not consume excessive processing power and memory space), a stochastic sampling process with Poisson distribution qualities may be used in selecting sample points from within each circle of confusion (e.g., for each point being blurred). A stochastic sampling with Poisson distribution has the beneficial properties of selecting sample points that are closely packed together, without being too close to each other (e.g., each sample being at least a specified minimum distance from every other sample).

Figure 3:
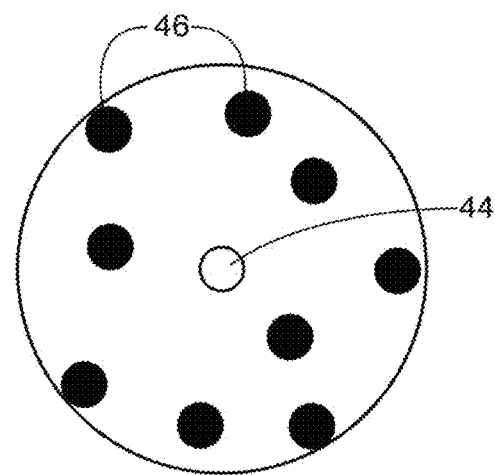
FIG. 3 is a diagram of an illustrative Poisson disk that may be used in blurring images to reduce the depth of field of those images in accordance with an embodiment of the present invention.

As example of a Poisson disk sample is shown in FIG. 3. As shown in FIG. 3, a Poisson disk sample centered on center sample 44 may have outer samples 46 arranged as illustrated. The arrangement of FIG. 3 is merely one of numerous random possibilities. In the illustrative Poisson disk sample of FIG. 3, each outer sample 46 is at least a given distance away from every other sample and each sample will lie within the area of the disk (e.g., not be more than a radius distance away from the center sample 44).

Figure 5:
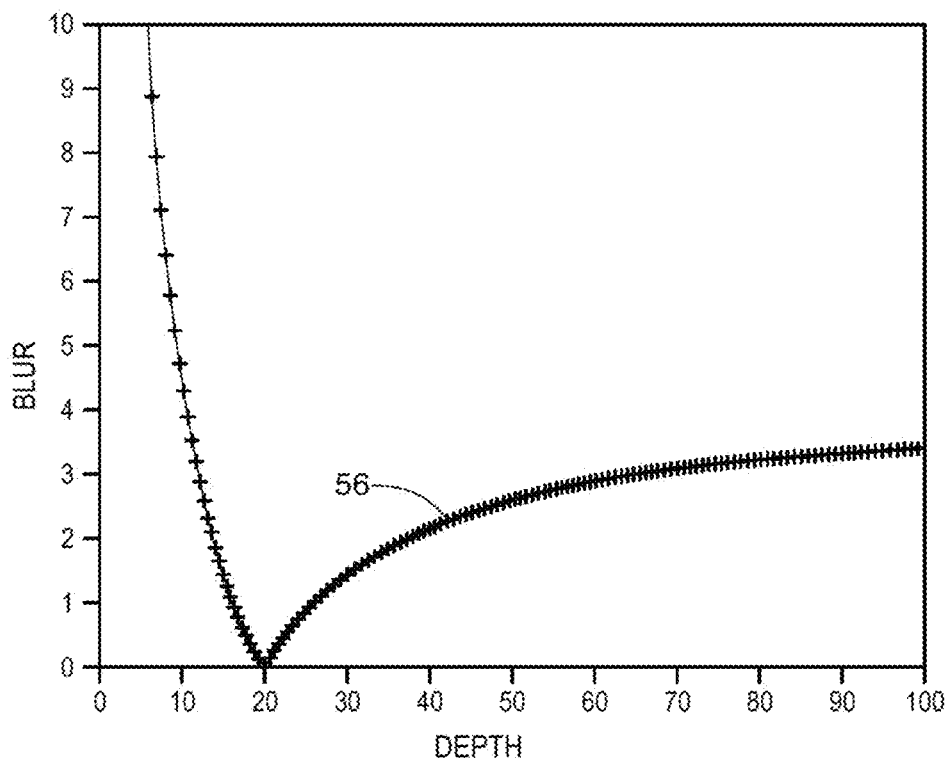
FIG. 5 is a chart showing illustrative relationships between the size of a circle of confusion versus distance from a focal plane, which may be used in blurring images to reduce the depth of field of those images in accordance with an embodiment of the present invention.

Illustrative relationships between the radii of circles of confusion versus depth are shown via the curve 56 of FIG. 5. The x-axis of FIG. 5 may be in any desired length scale, such as millimeters, centimeters, meters, inches, feet, yards, etc., and may represent the distance from the imager (e.g., device 10. The y-axis of FIG. 5 may be in any desired length scale and may represent the radius of the circle of confusion (e.g., amount of blur) applied in order to produce (e.g., simulate) a shallow depth of field image. In the example of FIG. 5, the focal plane is at the 20 position along the x-axis. As shown in FIG. 5, the blur or size of the circle of confusion increase when a point (e.g., an object) is closer to the imager or further away from the imager than the focal point.

In some arrangements, stereo disparity may be used in computing depth and the depth then used for blurring operations. In these and other arrangements, depth (e.g., a depth map) may be deduced from a disparity map, which is a map of pixel disparities in left and right images (e.g., a map detailing how much each object in a scene shifts in the left and right image, which is indicative of its distance from the stereo imager). In general, the depth of a particular object is a function proportional to the focal length and baseline separation between the left and right cameras and inversely proportional to the disparity of that object. Using this information, it is possible to deduce the relationship between disparity and blur (e.g., the radius of the circle of confusion) for reducing depth of field. The relationship between disparity and blur can then be used to roughly control the blur (e.g., to produce reduced depth of field images) without knowledge of the focal length or baseline separation.

Figure 6:
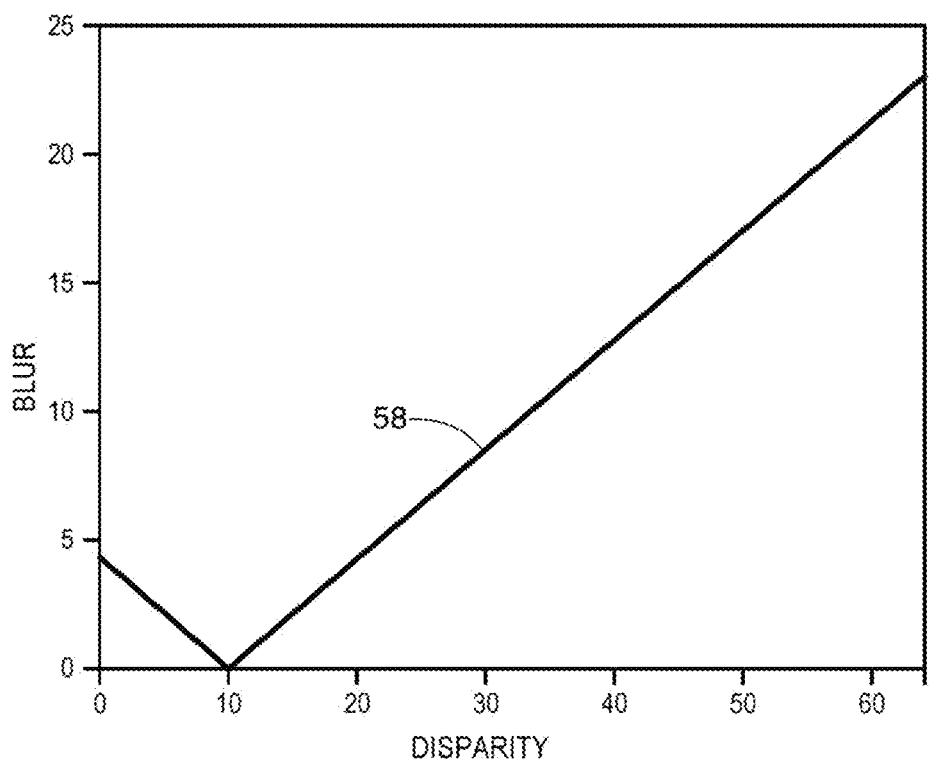
FIG. 6 is a chart showing illustrative relationships between the size of a circle of confusion versus stereo disparity, which may be used in blurring images to reduce the depth of field of those images in accordance with an embodiment of the present invention.

Illustrative relationships between the radii of circles of confusion (e.g., amount of blur) versus stereo disparity are shown via the curve 58 of FIG. 6. The x-axis of FIG. 6 may represent stereo disparity (e.g., the distance an object moves between the first and second imagers), while the y-axis of FIG. 6 may represent the radius of the circle of confusion (e.g., amount of blur) applied in order to produce (e.g., simulate) a shallow depth of field image. As shown in FIG. 4, the blur amount may be linearly proportional to stereo disparity. Once again, the point of zero blur is the location of the focal plane/point (10 on the a-axis in the scale of FIG. 6). The slope of curve 58 may be determined by the simulated f-stop of the imager (e.g., the aperture size). The steeper the slope, the lower the depth of field of the corresponding image. For at least these reasons, device 10 may receive user input to adjust the simulated f-stop (e.g., to adjust how much the depth of field is reduced). The user input may alter the slot of curves 56 and 58 for image processing operations.

As illustrated in the examples of FIGS. 5 and 6, the amount of blur applied to each point in an image is determined by the depth of each point in the image relative to the focal place. In particular, the blur kernel size for each point is determined based on its relative depth. When a particular point is significantly closer or further from the lens than the focal plane, the blur kernel size will be larger. When the blur kernel size for a particular pixel or location is large, image data for that pixel may be replaced by averaging pixel data from pixels within the blur kernel (which may be centered on that particular pixel).

Figure 7:
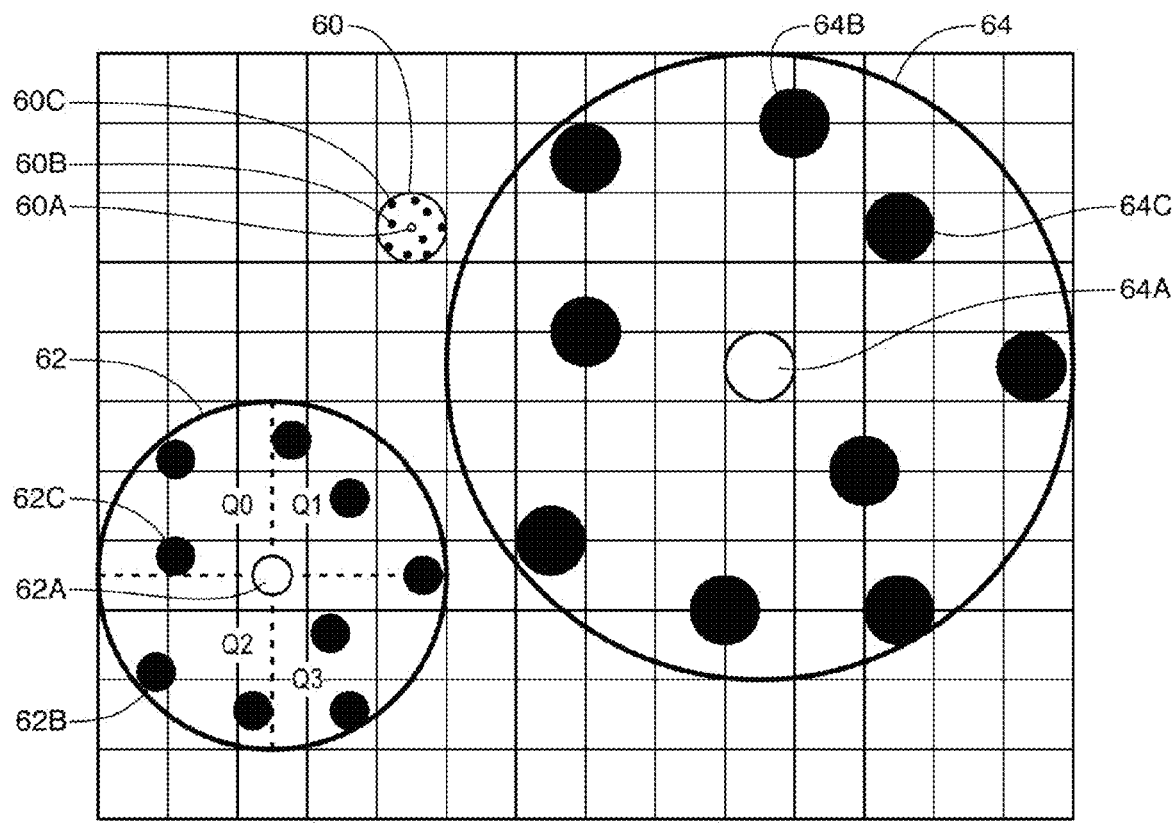
FIG. 7 is a diagram of illustrative Poisson disks, or circles of confusion, on an illustrative image that may have its depth of field reduced at least partly using the Poisson disks in accordance with an embodiment of the present invention.

As shown in the example of FIG. 7, Poisson disk sampling may be used to select pixels with each blur kernel for use in blurring operations, as opposed to merely using all of the pixels within each blur kernel which would be computationally time-consuming and consuming large amounts of memory. These stochastic sampling techniques (e.g., use of a Poisson disk) may yield results (e.g., blurred values) similar to full kernel processing (e.g., using all of the pixels within each blur kernel), while having a constant or linear computational time. In contrast, utilizing all of the pixels within each blur kernel would result in the computational time increasing with the square of the radius of the blur kernel.

When blurring a particular pixel, the Poisson disk for that pixel may be centered on that pixel and the initial sample for the Poisson disk may be that particular pixel. FIG. 7 illustrates this type of arrangement applied to three differently sized Poisson disks 60, 62, and 64 being used to blur three pixels, namely the pixels underneath samples 60A, 62A, and 64A. With some suitable arrangements, additional samples (e.g., the black dots within each Poisson disk) are selected using basic criteria. As an example, additional samples such as samples 60B, 60C, 62B, 62C, 64B, and 64C may be a minimum distance away from other samples, including the initial center samples, of at least half of the radius of the Poisson disk. With this type of arrangement, it would be possible to have a line from the center sample to the edge of the Poisson disk that intersects the center sample and two additional samples (a first sample halfway between the center and the edge and a second sample along the edge). This type of arrangement may also ensure that the total number of samples in each Poisson disk remains relatively constant (e.g., independent of the size of the Poisson disk). In some situations (e.g., when the Poisson disk is smaller than a given amount), the total number of samples may be reduced (e.g., since the Poisson disk may include fewer total pixels than the maximum number of pixels to be sampled).

In the example of FIG. 7, Poisson disk 60 has an area that covers only a single pixel, namely the pixel being blurred by Poisson disk 60. In such arrangements, no change to the image data of the underlying pixel is made (e.g., no blur is made to the underlying pixel). Small Poisson disks such as disk 60 may be applied to regions having a depth in the image equal, or nearly equal to, the focal plane.

Poisson disk 62 has an area larger than disk 60 and covers a relatively moderate number of pixels. In such arrangements, the pixel being blurred, namely the pixel underneath center sample 62A, is moderately distant from the focal plane and is blurred moderately. If desired, the pixel values of the initial sample, sample 62A, and the pixel values of the additional samples, including samples 62B and 62C, may be averaged together to generate a new blurred pixel value (e.g., blurred image value) that replaces the original pixel value of the pixel being blurred.

Poisson disk 64 has an area larger than disk 62 and covers a relatively large number of pixels. In such arrangements, the pixel being blurred, namely the pixel underneath center sample 64A, is relatively distant (relative to the pixels blurred by discs 62 and 60) from the focal plane and is blurred aggressively. If desired, the pixel values of the initial sample, sample 62A, and the pixel values of the additional samples, including samples 64B and 64C, may be averaged together to generate a new blurred pixel value (e.g., blurred image value) that replaces the original pixel value of the pixel being blurred.

If desired, any number of additional samples in a particular Poisson disk may be discarded to improve image quality in the blurred image. In some arrangements, any additional samples, such as samples 62B and 62C in Poisson disk 62, that are at least a given distance (or stereo disparity) behind the center sample, such as sample 62A, may be discarded to avoid unnatural backward light scattering affects. For example, if sample 62B has a depth (distance from the lens) greater than the depth of sample 62A plus a preset threshold, then sample 62B may be rejected. Furthermore, if sample 62C has a depth less than the depth of sample 62A plus the preset threshold (or simply less than the depth of sample 62A), then sample 62C may be used in blurring operations. In other suitable arrangements, any additional samples that are at least a given distance (or stereo disparity) in front of the center sample may be discarded (e.g., in addition to or instead of discarding additional samples that are at least a given distance behind the center sample). If desired, the threshold distances for discarding samples may be different depending on whether the pixel is behind or in front of the center sample.

With some suitable arrangements, a sampling arrangement may be used that seeks to maintain circular symmetry in the selection of M sampling points (e.g., the desired number of sampling points). As an example, quadrant (or other) regularization may be used in selecting each sample. In particular, each blur kernel (e.g., discs such as disc 60, 62, and 64) may be broken up into four quadrants, was as upper left quadrant Q0, upper right quadrant Q1, lower left quadrant Q2, and lower right quadrant Q3, illustrated in disc 62 (using dashed lines to separate the quadrants). Initially, each of the quadrants will be empty of selected sample points. The first sample point may then be randomly selected from anywhere in the disc (e.g., from any of the quadrants). For the sake of the present discussion, let us assume that the first sample is randomly selected to be in quadrant Q0. At this stage, the second sample point may be randomly selected from any of the quadrants that are still empty (e.g., Q1, Q2, and Q3, each of which has a lower number of samples than Q1). For the sake of the present discussion, let us assume that the first sample is randomly selected to be in quadrant Q1. At this stage, the third sample point may be randomly selected from any of the quadrants that are still empty (e.g., Q2 and Q3). Following this procedure, the fourth sample point may be randomly selected from a location within the remaining empty quadrant (e.g., if the third sample is in Q2, the fourth sample will be in Q3). This procedure may continue (e.g., such that, in general, no quadrant has more than one sample more than any other quadrant, except that certain pixels, such as those behind the initial sample, may be rejected as previously discussed) until either no points are available (that would satisfy any minimum distance requirements) or when the desired number of sampling points (e.g., M sampling points) is reached. In this type of arrangement, minimum distance requirements can be reduced (e.g., to less than half of the radius of the blur kernel) without compromising quality.

As shown in the FIG. 7 example, some of the selected additional samples (e.g., the samples shaded in black) such as samples 62B, 62C, 64B, and 64C may overlap multiple pixels. In such situations, whichever underlying pixel is most covered by the overlapping sample may be selected. If there should be a tie, a randomized selection may be made between the underlying pixels that tied.

Figure 8:
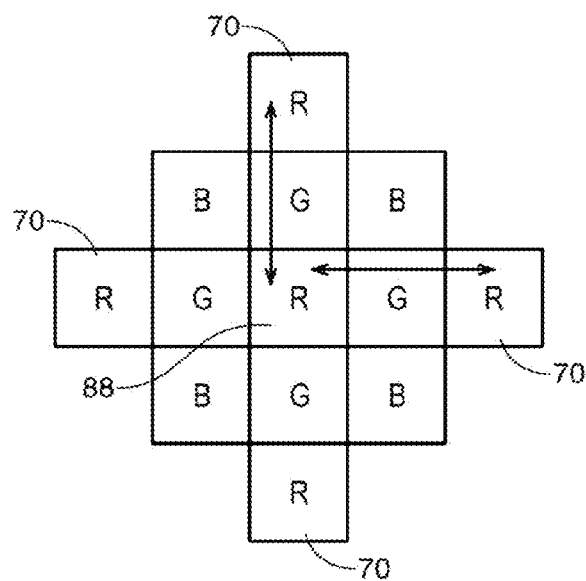
FIG. 8 is a diagram of illustrative potential samples within a circle of confusion having a radius of 2 pixels in accordance with an embodiment of the present invention.

An illustrative Poisson disk having a radius (e.g., a circle of confusion) of two pixel widths is shown in FIG. 8. In FIG. 8, the center red pixel 88 is being blurred by averaging pixel 88 with other red pixels within the circle of confusion (e.g., blur kernel). In this instance, the minimum distance between samples may again be half of the radius, or one pixel width. When these sampling conditions are applied to the Poisson disk of FIG. 8, all of the red pixels 70 surrounding the center pixel 88 may be used in blurring the center pixel 88 (e.g., the values of all the red pixels in the Poisson disk may be averaged to calculate the new blurred value for the center red pixel 88).

Images captured by device 10 (or by another device) may be blurred by device 10 in order to simulate a low depth of field. The focal plane on the blurred image may be present, or may be user selectable. In particular, a user may provide input identifying a particular depth as the focal plane. As one example, the original image may be displayed on a touch screen and the user may select the depth of the focal plane by touching a particular part of the touch screen. The depth of the image at the part of the touch screen touched by the user may then be taken as the focal plane for subsequent depth-based burring image processing operations. An illustration of this arrangement is shown in FIGS. 9 and 10.

Figure 9:
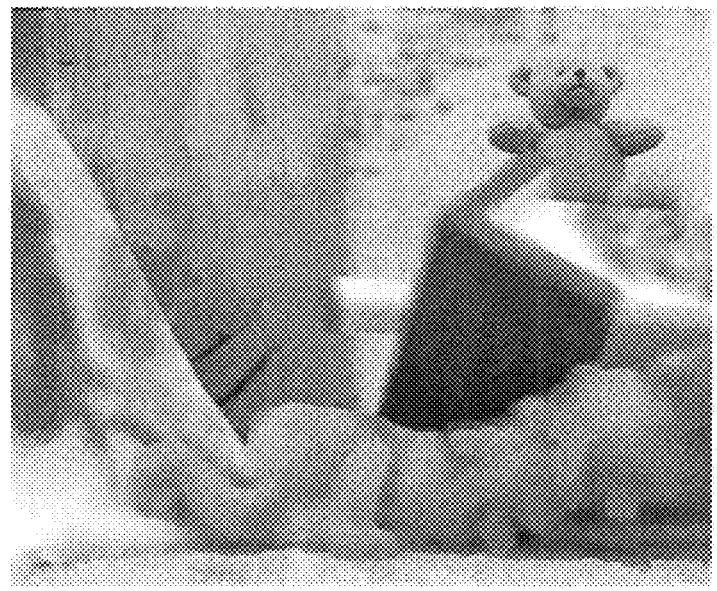
FIG. 9 is an illustrative image in which image processing in accordance with an embodiment of the present invention has been used to set the focal plane to an object (e.g., a bear) located further back in the image and reduce the depth of field of the image.

FIG. 9 shows an example of an image blurred using the depth based blur operations described herein, when the focal plane is set towards the rear of the image. In particular, the focal plane is set to the depth of the bear in the upper right and in the background of the image. As previously described, the focal plane may be set to the bear (or another object) in response to user input (e.g., receiving user input touching the bear on a touch screen display). FIG. 10 shows an example of a blurred image, similar to FIG. 9 except that the focal plane is set towards the front of the image. In particular, the focal plane is set to the depth of the cacti, specifically the left (or back) cactus. As shown in the FIGS. 9 and 10 examples, objects that are closer to and further from the lens than the focal plane and objects are blurred. In addition, the blurring may increase with increasing distance from the focal plane.

Figure 10:
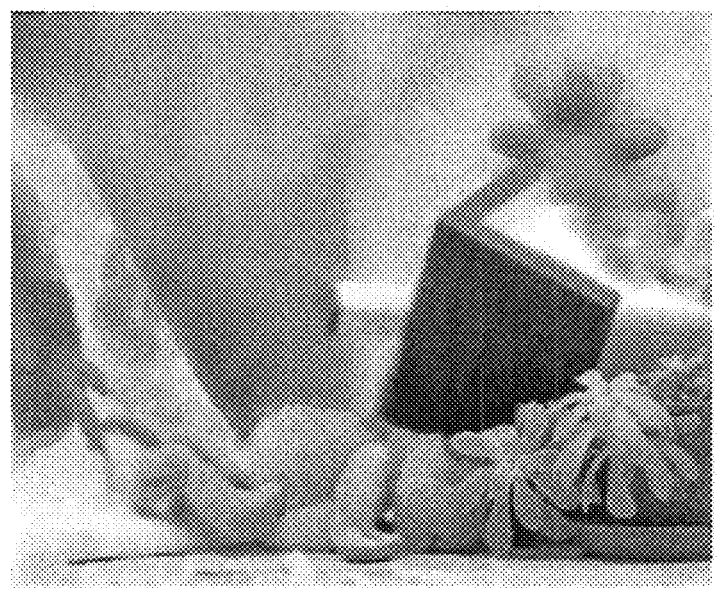
FIG. 10 is an illustrative image in which image processing in accordance with an embodiment of the present invention has been used to set the focal plane to an object (e.g., a cactus) located further forwards in the image and reduce the depth of field of the image.
Figure 11:
FIG. 11 is an illustrative depth map that may be used in producing images such as the images of FIGS. 9 and 10 having reduced depth of field in accordance with an embodiment of the present invention.

The example images of FIGS. 9 and 10 may be blurred using a common depth map, as example of which is shown in FIG. 10. A depth map, such as the depth map of FIG. 10, may be calculated from stereo images, or using another source (e.g., a separate depth sensor that determines distances to multiple points in the scene). One or both of the stereo images (i.e., the left and right images) used in calculating a depth map may be blurred using the depth based blur operations described herein. In arrangements in which both stereo images are blurred, the resulting blurred images may be used in presenting a user with a three-dimension display having depth based blur (e.g., a reduced depth of field and a focal plane selected by the user). (The various image artifacts present in the blurred images of FIGS. 9 and 10 are, for the most part, attributable to the inaccuracy of the depth map of FIG. 11, which was used in the depth based blurring operations. In arrangements, in which an accurate and detailed depth map is available or can be calculated from a stereo image, the various image artifacts present in the images of FIGS. 9 and 10 would not be present.)

Figure 12:
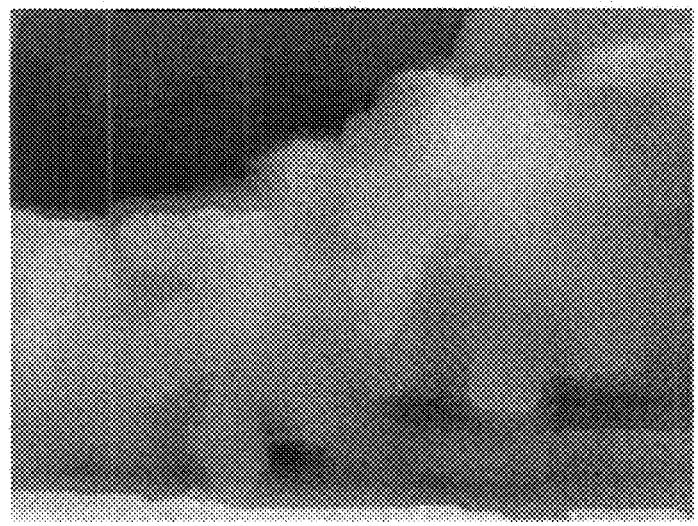
FIG. 12 is a zoomed-in view of an object (e.g., a cactus) located further forwards in the image of FIG. 9 in accordance with an embodiment of the present invention.
Figure 13:
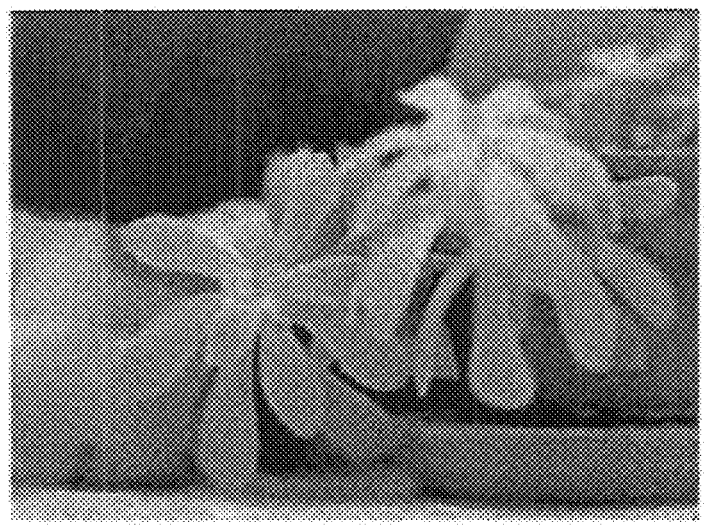
FIG. 13 is a zoomed-in view of an object (e.g., a cactus) located further forwards in the image of FIG. 10 in accordance with an embodiment of the present invention.

FIGS. 12 and 13 are zoomed-in views of the cacti of FIGS. 9 and 10, respectively. In FIG. 12, the focal plane is set to an object near the background of the image (e.g., the bear), so the cacti are significantly blurred. In contrast, in FIG. 13, the focal plane is set to the cacti (specifically the left cactus), so the left cactus is essentially un-blurred and the right cactus is blurred only to a small extent.

Figure 14:
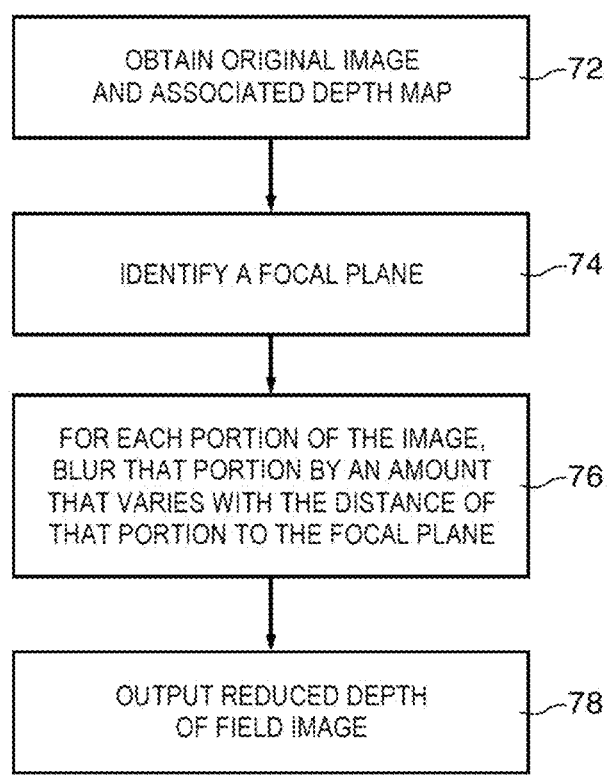
FIG. 14 is a flowchart of illustrative steps involved in reducing the depth of field of an image in accordance with an embodiment of the present invention.

A flowchart of illustrative steps involved in reducing the depth of field of one or more images is shown in FIG. 14.

In step 72, an original image, having a relatively large depth of field, may be obtained. The original image may be obtained from a camera sensor such as sensor 14 of device 10, retrieved from data storage such as storage 24 of device 10, or obtained from an external electronic device. The original image may, if desired, be a stereo image including a left image and a right image.

Step 72 may also include obtaining a depth map associated with the original image. In arrangements in which the original image is a stereo image (or a part of a stereo image), the depth map may be calculated using the stereo image (e.g., by determining the disparity of various points from the left and right images of the stereo image). In addition or alternatively, the depth may be obtained from separate sensors (e.g., depth sensors, proximity sensors, etc.) that are a part of device 10 or an external device. Such sensors may be a part of camera module 12, host subsystem 20, or another portion of device 10.

In step 74, a focal plane for the reduced depth of field image may be identified. The focal plane for the reduced depth of field image may be identified, as an example, in response to input received from a user indicating the user's preference for the location of the focal plane (e.g., upon receiving a user's touch input on a touch screen display in device 10).

In step 76, each portion of the original image (which may include both the left and right images of a stereo image) may be blurred by an amount that varies with the distance to the focal plane. In particular, portions of the original image that are relatively close to the focal plane may not be blurred, or blurred only to a small amount, while portions of the original image that are far behind or in front of the focal plane may be significantly blurred.

In step 78, the blurred image, now having a depth of field less than the original image, may be output. In particular, the image may be stored in storage circuitry such as circuitry 24, displayed on a display device such as device 22, and/or transmitted to external circuitry, as examples and as desired.

Figure 15:
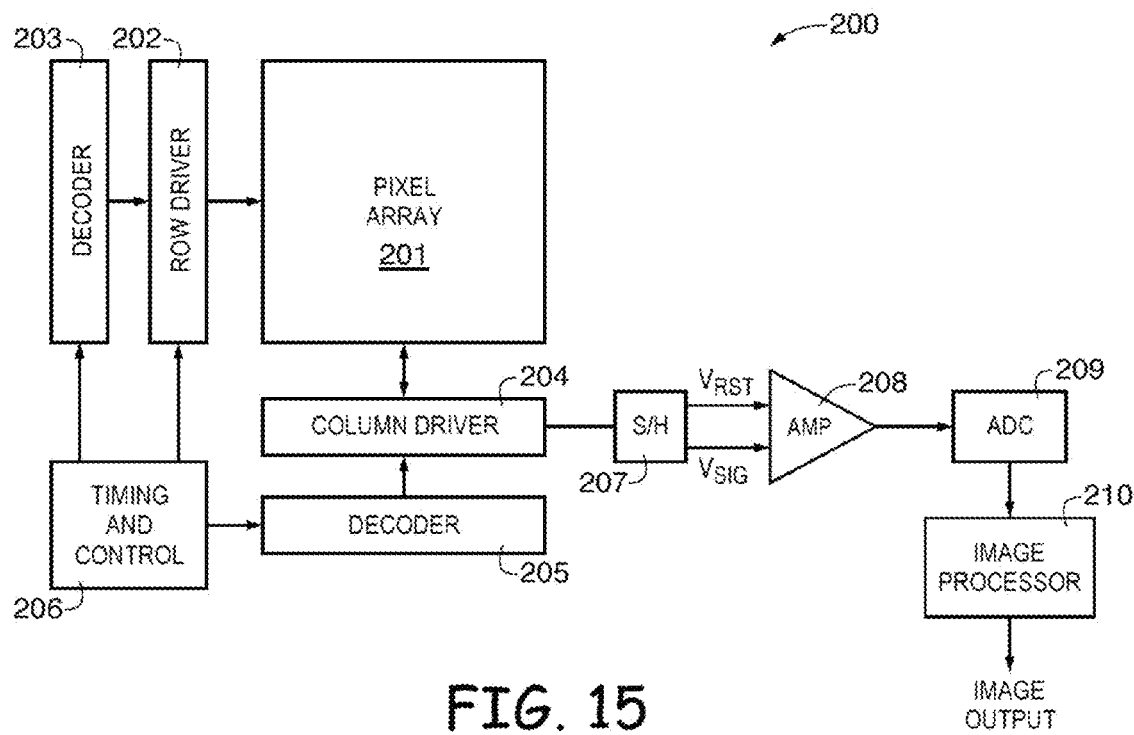
FIG. 15 is a block diagram of an imager employing one or more of the embodiments of FIGS. 1-14 in accordance with an embodiment of the present invention.

FIG. 15 illustrates a simplified block diagram of imager 200 (e.g., a CMOS imager that may capture images having a first depth of field and which are then manipulated by image processing circuitry, such as circuitry 16 and/or circuitry 24 of FIG. 1 to have a second and reduced depth of field as described herein). Pixel array 201 includes a plurality of pixels containing respective photosensors arranged in a predetermined number of columns and rows. The row lines are selectively activated by row driver 202 in response to row address decoder 203 and the column select lines are selectively activated by column driver 204 in response to column address decoder 205. Thus, a row and column address is provided for each pixel.

CMOS imager 200 is operated by a timing and control circuit 206, which controls decoders 203, 205 for selecting the appropriate row and column lines for pixel readout, and row and column driver circuitry 202, 204, which apply driving voltages to the drive transistors of the selected row and column lines. The pixel signals, which typically include a pixel reset signal Vrst and a pixel image signal Vsig for each pixel are sampled by sample and hold circuitry 207 associated with the column driver 204. A differential signal Vrst-Vsig is produced for each pixel, which is amplified by amplifier 208 and digitized by analog-to-digital converter 209. The analog to digital converter 209 converts the analog pixel signals to digital signals, which are fed to image processor 210 which forms a digital image.

Figure 16:
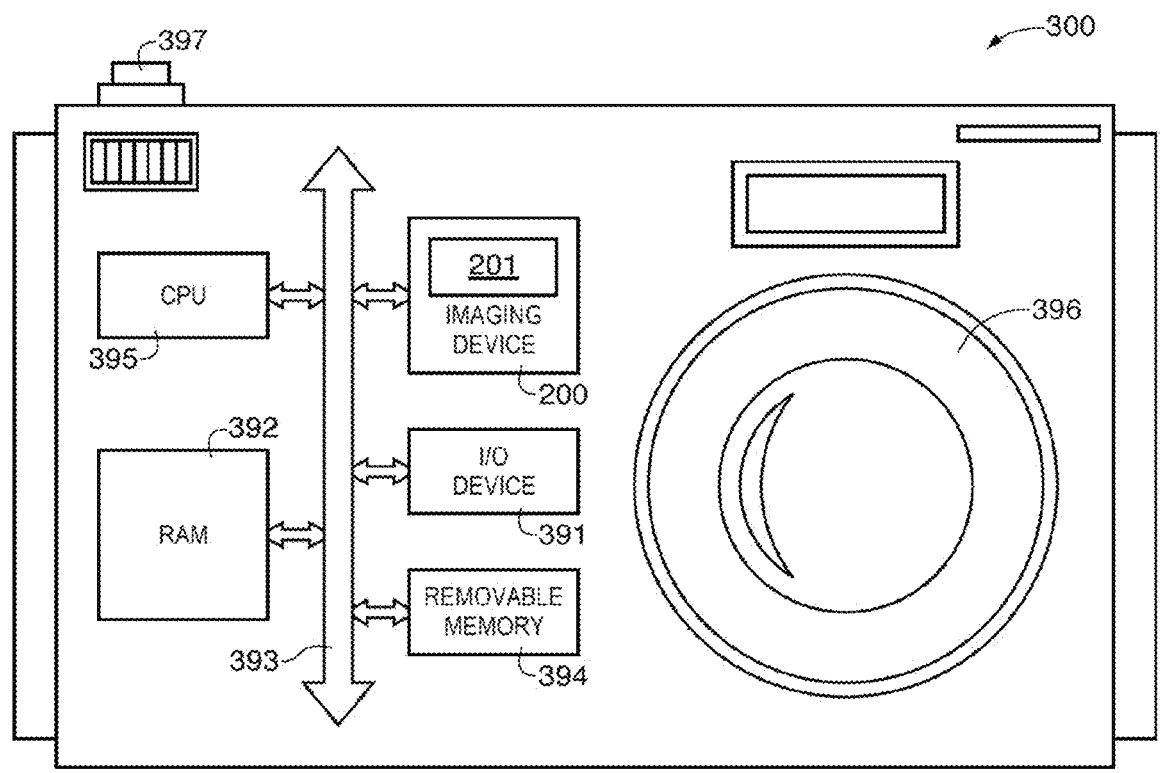
FIG. 16 is a block diagram of a processor system employing the imager of FIG. 15 in accordance with an embodiment of the present invention.

FIG. 16 shows in simplified form a typical processor system 300, such as a digital camera, which includes an imaging device such as imaging device 200 (e.g., an imaging device 200 that may capture images having a first depth of field and which are then manipulated by image processing circuitry such as circuitry 16 and/or circuitry 24 of FIG. 1 to have a second and reduced depth of field as described herein). Processor system 300 is exemplary of a system having digital circuits that could include imaging device 200. Without being limiting, such a system could include a computer system, still or video camera system, scanner, machine vision, vehicle navigation, video phone, surveillance system, auto focus system, star tracker system, motion detection system, image stabilization system, and other systems employing an imaging device.

Processor system 300, which may be a digital still or video camera system, may include a lens such as lens 396 for focusing an image onto a pixel array such as pixel array 201 when shutter release button 397 is pressed. Processor system 300 may include a central processing unit such as central processing unit (CPU) 395. CPU 395 may be a microprocessor that controls camera functions and one or more image flow functions and communicates with one or more input/output (I/O) devices 391 over a bus such as bus 393. Imaging device 200 may also communicate with CPU 395 over bus 393. System 300 may include random access memory (RAM) 392 and removable memory 394. Removable memory 394 may include flash memory that communicates with CPU 395 over bus 393. Imaging device 200 may be combined with CPU 395, with or without memory storage, on a single integrated circuit or on a different chip. Although bus 393 is illustrated as a single bus, it may be one or more buses or bridges or other communication paths used to interconnect the system components.

Various embodiments have been described illustrating image processing systems for reducing the depth of field of an image.

A camera sensor may capture images having an initial depth of field. For various reasons (described herein), a user may desire to obtain images having a depth of field less than the initial depth of field. The camera sensor may, however, have limitations that prevent it from directly obtaining images having low depth of field (e.g., due to lens constraints, lighting constraints, etc.). In addition or alternatively, the user may not decide they prefer images having a low depth of field until after capturing an image having a high depth of field.

Image processing circuitry may be used to reduce the initial depth of field of an image. The depth of field may be reduced to a user selected level and the reduced depth of field image may have a user selected focal plane. The image processing circuitry may, as an example, blur regions of the image that are behind or in front of the user selected focal plane. Regions of the image may be blurred depending on their distance from the user selected focal plane and depending on the user selected depth of field level (e.g., regions that are further from the focal plane may be blurred more and, when the user selects a lower depth of field level, those regions may be even further blurred). The resulting image may be stored on storage circuitry, displayed on one or more display devices, and/or conveyed to an external device.

The foregoing is merely illustrative of the principles of this invention and various modifications can be made by those skilled in the art without departing from the scope and spirit of the invention. The foregoing embodiments may be implemented individually or in any combination.

What is claimed is:

1. A method of defocusing a first image to produce a second image, the method comprising:
   obtaining the first image and a depth map associated with the first image;
   for each of a plurality of pixels of the first image and using the depth map, determining the distance between that pixel and a focal plane in the second image;
   for each of the plurality of pixels of the first image, identifying an associated sampling region that includes that pixel and that has an area at least based on the distance between that pixel and the focal plane; and
   for each of the plurality of pixels of the first image, identifying a given number of sample pixels that includes at least that pixel and each of which lie within the associated sampling region of that pixel, wherein the given number of sample pixels is substantially equal for all of the sample regions.

2. The method defined in claim 1 further comprising:
   for each of the plurality of pixels of the first image, averaging together image values of all of the sample pixels that lie within the associated sampling region of that pixel to generated a defocused pixel value; and
   producing the second image using the defocused pixel values.

3. The method defined in claim 1 wherein all of the sample regions have an area that is greater than a given threshold area, wherein the plurality of pixels of the first image comprises a first plurality of pixels of the first image, and wherein the method further comprises:
   for each of a second plurality of pixels of the first image and using the depth map, determining the distance between that pixel and the focal plane in the second image;
   for each of the second plurality of pixels of the first image, identifying an associated sampling region that includes that pixel and that has an area at least based on the distance between that pixel and the focal plane; and
   for each of the second plurality of pixels of the first image, identifying at least one sample pixel that includes at least that pixel and each of which lies within the associated sampling region of that pixel, wherein the number of sampling pixels identified for each of the second plurality of pixels is less than the given number of sample pixels.

4. The method defined in claim 3 wherein each of the sampling regions associated with the second plurality of pixels has an area that is less than the given threshold area.

5. The method defined in claim 4 wherein, for each of the first plurality of pixels, the distance between that pixel and the focal plane is greater than a given distance and wherein, for each of the second plurality of pixels, the distance between that pixel and the focal plane is less than the given distance.

6. The method defined in claim 1 wherein each of the plurality of pixels of the first image has at a respective depth in the depth map and wherein identifying the sample pixels for each of the plurality of pixels comprises:
   for each of the plurality of pixels, setting a back threshold equal to the depth of that pixel plus a threshold distance; and
   for each of the plurality of pixels, selecting, as sample pixels, pixels that have a depth in the depth map that is less than or equal to the back threshold of that pixel and rejecting, as sample pixels, any pixels that have a depth in the depth map that is greater than the back threshold of that pixel.

7. The method defined in claim 1 wherein the first image comprises a stereo image formed from left and right images.

8. The method defined in claim 7 wherein obtaining the depth map comprises determining stereo disparity for the plurality of pixels of the first image based on stereo differences between the left and right image.

9. The method defined in claim 8 wherein the area of each of the sampling regions is linearly proportional to the stereo disparity of the associated pixel.

10. A method, comprising:
    obtaining a first image having a plurality of first pixels, wherein the first image has a first depth of field and is substantially in focus between first and second depths;
    obtaining a depth value for each of the first pixels; and
    using the depth values, defocusing the first image to create a second image that has a second depth of field and that is substantially in focus between third and fourth depths, wherein defocusing the first image to create the second image comprises:
       calculating a plurality of defocused pixel values for the second image, wherein each defocused pixel value is calculated using a given number of pixels from the first image and wherein the given number of pixels used in calculating each defocused pixel value is substantially equal for each of the defocused pixel values.

11. The method defined in claim 10 wherein the second depth of field is less than the first depth of field and wherein the third and fourth depths each lie between the first and second depths.

12. The method defined in claim 11 wherein the second image has a focal plane located approximately midway between the third and fourth depths, wherein calculating each of the defocused pixel values comprises:
    starting with an initial pixel in the first image, determining the distance between the initial pixel and the focal plane of the second image; and
    identifying a sampling region approximately centered on the initial pixel, wherein the sampling region has a width that is proportional to the distance between the initial pixel and the focal plane.

13. The method defined in claim 12 further comprising:
    determining the location of the focal plane of the second image in response to user input identifying the location of the focal plane.

14. The method defined in claim 13 wherein there is a difference between the third and fourth depths, over which the second image is substantially in focus, the further comprising:
    determining the magnitude of the difference between the third and fourth depths in response to user input identifying the second depth of field of the second image.

15. The method defined in claim 14 wherein the widths of the sampling regions are at least partly based on the user input identifying the second depth of field of the second image.

16. A system, comprising:
    a central processing unit;
    memory;
    input-output circuitry;
    an imaging device that captures a first image having a first depth of field;

image processing circuitry that defocuses the first image to create a second image having a second depth of field that is less than the first depth of field, wherein the image processing circuitry defocuses the first image using a plurality of defocus kernels each formed from a given number of pixel samples from the first image, wherein each of the defocus kernels has a width that is proportional to its distance from a focal plane in the second image and wherein the given number of pixel samples in each of the defocus kernels is substantially independent of the widths of the defocus kernels.

17. The system defined in claim 16 further comprising:
a touch screen that displays the first image, that receives user input comprising a touch event on a portion of the displayed first image that identifies the focal plane in the second image, and that displays the second image after receiving the user input.

\* \* \* \* \*